(12) United States Patent
Sarigiannidis et al.

(10) Patent No.: US 12,235,615 B2
(45) Date of Patent: Feb. 25, 2025

(54) SYSTEM AND METHOD FOR STATIC AUTO-TUNING ELECTRIC MOTOR

(71) Applicant: Nidec Motor Corporation, St. Louis, MO (US)

(72) Inventors: Athanasios Sarigiannidis, Athens (GR); Bo-Ting Lyu, Tainan (TW); Yi-Chieh Chen, Tainan (TW); Shih-Chin Yang, Taipei (TW)

(73) Assignee: Nidec Motor Corporation

( * ) Notice: Subject to any disclaimer, the term of this patent is extended or adjusted under 35 U.S.C. 154(b) by 316 days.

(21) Appl. No.: 17/965,963

(22) Filed: Oct. 14, 2022

(65) Prior Publication Data

US 2024/0085867 A1 Mar. 14, 2024

(30) Foreign Application Priority Data

Sep. 12, 2022 (GR) .............................. 20220100739

(51) Int. Cl.
*G05B 13/04* (2006.01)
(52) U.S. Cl.
CPC ................. *G05B 13/042* (2013.01)
(58) Field of Classification Search
CPC .................................................. G05B 13/042
See application file for complete search history.

(56) References Cited

U.S. PATENT DOCUMENTS

| | | | |
|---|---|---|---|
| 7,057,366 B1 | 6/2006 | Tsai et al. | |
| 8,232,758 B2 | 7/2012 | Okita et al. | |
| 9,007,004 B2 * | 4/2015 | Hunter | H02P 21/18 |
| | | | 318/609 |
| 9,768,720 B2 | 9/2017 | Yang et al. | |
| 2020/0343841 A1 * | 10/2020 | Rotilli Filho | H02P 6/183 |
| 2020/0356173 A1 * | 11/2020 | Bajaj | G08B 6/00 |

FOREIGN PATENT DOCUMENTS

| | | |
|---|---|---|
| CN | 1988771 | 5/2010 |
| JP | 2014107945 | 6/2014 |

* cited by examiner

*Primary Examiner* — Zoheb S Imtiaz
(74) *Attorney, Agent, or Firm* — Hovey Williams LLP

(57) ABSTRACT

A static auto-tuning system and method for controlling operation of a motor in a system. A speed reference signal is generated resulting in a speed response of the motor. Closed-loop feedback magnifies the rotating friction effect to an observable level. Inertia and rotating friction coefficient values of the system are estimated based on the speed frequency response and a virtual damping coefficient. A fixed low frequency speed signal may result in a first frequency response function for determining virtual damping, and a variable frequency excitation signal may result in a second frequency response function for determining the inertia and rotating friction characteristics. Closed-loop gains are determined based on these characteristics. The excitation signal may be sampled and a peak value in each interval may be identified and stored to produce an envelope of peak values for determining the gain response. Operation of the motor is controlled using the determined gains.

20 Claims, 7 Drawing Sheets

SYSTEM AND METHOD FOR STATIC AUTO-TUNING ELECTRIC MOTOR

FIELD

The present invention relates to systems and methods for controlling the operation of electric motors, and more particularly, embodiments concern a system and method for static auto-tuning an electric motor in a system to improve controlling the operation of the motor.

BACKGROUND

It is desirable to control the operation of electric motors in systems such as industrial robots and other machinery, automated guided vehicles (AGV), and the like. For example, when a motor is moved from a current position, or current rotation angle, to a designated position, it may be desirable to control such aspects of movement as acceleration, speed, and deceleration. In order to control this movement, it may be desirable to measure certain characteristics of the system such as an inertia value and a rotating friction coefficient value. Existing solutions for measuring these system characteristics can be complex, calculation intensive, costly, and require abrupt system movement under load.

Conventionally, there are two types of auto-tune solutions, rotational and static. In rotational auto-tuning, the motor is subjected to both high acceleration and high deceleration. The inertia of the system is calculated from the slope of the acceleration, and the friction coefficient of the system is calculated from the speed decay rate of the deceleration. This solution is easy and accurate, but it is not practical when the motor is incorporated into a robotic arm, AGV, or similar system which allows only for limited displacement of the rotor.

In static auto-tuning, the motor is subjected only to relatively small movements rather than continuous rotation. A vibrational torque command injects torque to facilitate estimating the parameters of the system in the frequency domain. However, because the inertia value and the friction coefficient value are unknown before tuning, the rotor displacement and speed response can be unpredictable in the tuning process. This may result in safety concerns because the movements are not limited or controlled.

Also in static auto-tuning, the accuracy of estimation is limited to the original system characteristics. In some cases, the signal-to-noise ratio becomes very low when low speed vibration torque is applied, so a complex signal processing algorithm is introduced to reduce the noise effect. However, the complex algorithm, which may be a fast Fourier transform (FFT), typically requires a separate central processing unit to handle the large amounts of real-time data and computation, which is not cost-effective for industrial applications.

SUMMARY

Embodiments of the present invention address the above-described and other problems and limitations in the prior art by providing a less complex, less calculation intensive, and less costly static auto-tuning system and method configured to accurately determine one or more characteristics, such as an inertia value and a rotating friction coefficient value, of a system, and then use the determined characteristics to calculate gain and better control operation, such as speed regulation, of a motor component of the system.

In an embodiment of the present invention, a system is provided comprising an electric motor and an electric motor controller. The electric motor may be configured to drive a load in the system, and may include a stator, a rotor, and a position sensor configured to determine a position of the rotor. The motor controller may be configured to control operation of the electric motor, and may include a control unit configured to control movement of the rotor. The control unit may include a static auto-tuning apparatus configured to determine a plurality of gains to facilitate controlling movement of the rotor, and the static auto-tuning apparatus may include a speed reference signal generator, a correction unit, and an estimation unit. The speed reference signal generator may generate a speed reference signal resulting in a speed response of the electric motor. The correction unit may use closed-loop feedback based on a speed command to correct a speed of the electric motor so that a magnitude of a high frequency response of the system is increased to facilitate estimating one or more characteristics of the system. The estimation unit may estimate the characteristics of the system based on the speed response and a determined virtual damping coefficient, may determine a gain frequency response based on the characteristics of the system, and may capture the plurality of gains based on the system gain frequency response. The control unit may then use the plurality of gains in controlling movement of the rotor.

Various implementations of the above-described embodiment may include any one or more of the following additional or alternative features. The system may be an automated guided vehicle, and the electric motor may be a servomotor. The position sensor may have a resolution of at least one thousand samples for each revolution of the rotor. The motor controller may further include an interface device configured to receive an input and to provide an output regarding operation of the motor controller, and the control unit may receive from the interface device the input which may include an upper limit value of a drive current of the motor, an upper limit value of a speed of the motor, a maximum speed amplitude ratio and a frequency bandwidth of the speed reference signal. The control unit may further include a control signal generator configured to generate a control signal based on the position of the rotor as determined by the position sensor, and an inverter configured to generate a drive voltage based on the control signal and to provide the drive voltage to the stator. The speed reference signal may be a chirp sinusoidal signal.

The speed reference signal generator may be configured to observe an amplitude of the speed response resulting from the speed reference signal, and to adjust a virtual attenuation value until the amplitude of the speed response is above a predefined threshold. The correction unit may then generate an excitation signal and obtain a frequency response function resulting from the excitation signal, the estimation unit may estimate the one or more characteristics of the system based on the frequency response function resulting from the excitation signal, the control unit may set one or more control parameters, including the closed loop gains, based on the characteristics of the system estimated by the estimation unit, and the control unit may control operation of the electric motor based on the control parameters. The one or more characteristics of the system may include an inertia value and a friction coefficient value. The speed reference signal may have a fixed frequency resulting in the speed response, based on which the correction unit determines a virtual damping coefficient which facilitates estimating a rotating friction value. The excitation signal generated by the correction unit may have a fixed amplitude and an increasing frequency, and result in a frequency response function based on which the estimation unit determines the inertia and rotating friction characteristics of the system. The estimation unit may sample the excitation signal at regular intervals and may identify and store a peak value in each interval to produce an envelope of peak values which may be used in determining the gain.

In another embodiment of the present invention, a static auto-tuning method is provided for facilitating controlling operation of an electric servomotor driving a load in a system. The electric servomotor may include a stator, a rotor, and a position sensor configured to determine a position of the rotor and having a resolution of at least one thousand samples for each revolution of the rotor. The static auto-tuning method may include the following steps. A speed reference signal may be generated resulting in a speed response of the servomotor. The speed reference signal may be a chirp sinusoidal signal. Closed-loop feedback may be used based on the speed response to correct the speed reference signal so that the rotating friction coefficient effect is observable and can be accurately estimated. One or more characteristics of the system, including an inertia value and a rotating friction coefficient value, may be estimated based on the speed response, and closed-loop speed gains may be determined based on the characteristics of the system. Movement of the rotor and the speed of the electric servomotor may be controlled using the resulting gains.

Various implementations of the above-described embodiment may include any one or more of the following additional or alternative features. An amplitude of the speed response resulting from the speed reference signal may be observed, and an attenuation value may be adjusted until the amplitude of the speed response is constant at a predefined value. An excitation signal may be generated and a frequency response function may be obtained resulting from the excitation signal, the one or more characteristics of the system may be estimated based on the frequency response function resulting from the excitation signal, one or more control parameters may be set based on the characteristics of the system, and operation of the servomotor may be controlled based on the control parameters. The speed reference signal may have a fixed amplitude sinusoidal signal resulting in the speed response, and the correction unit may determine the virtual damping coefficient which facilitates estimating the rotating friction. The excitation signal, generated by the correction unit, may implement a fixed amplitude, increasing frequency signal resulting in a frequency response function based on which the estimation unit may determine the inertia and rotating friction characteristics of the system. The excitation signal may be sampled at regular intervals and a peak value in each interval may be identified and stored to produce an envelope of peak values which may be used in determining the gain.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein.

Figure 5:
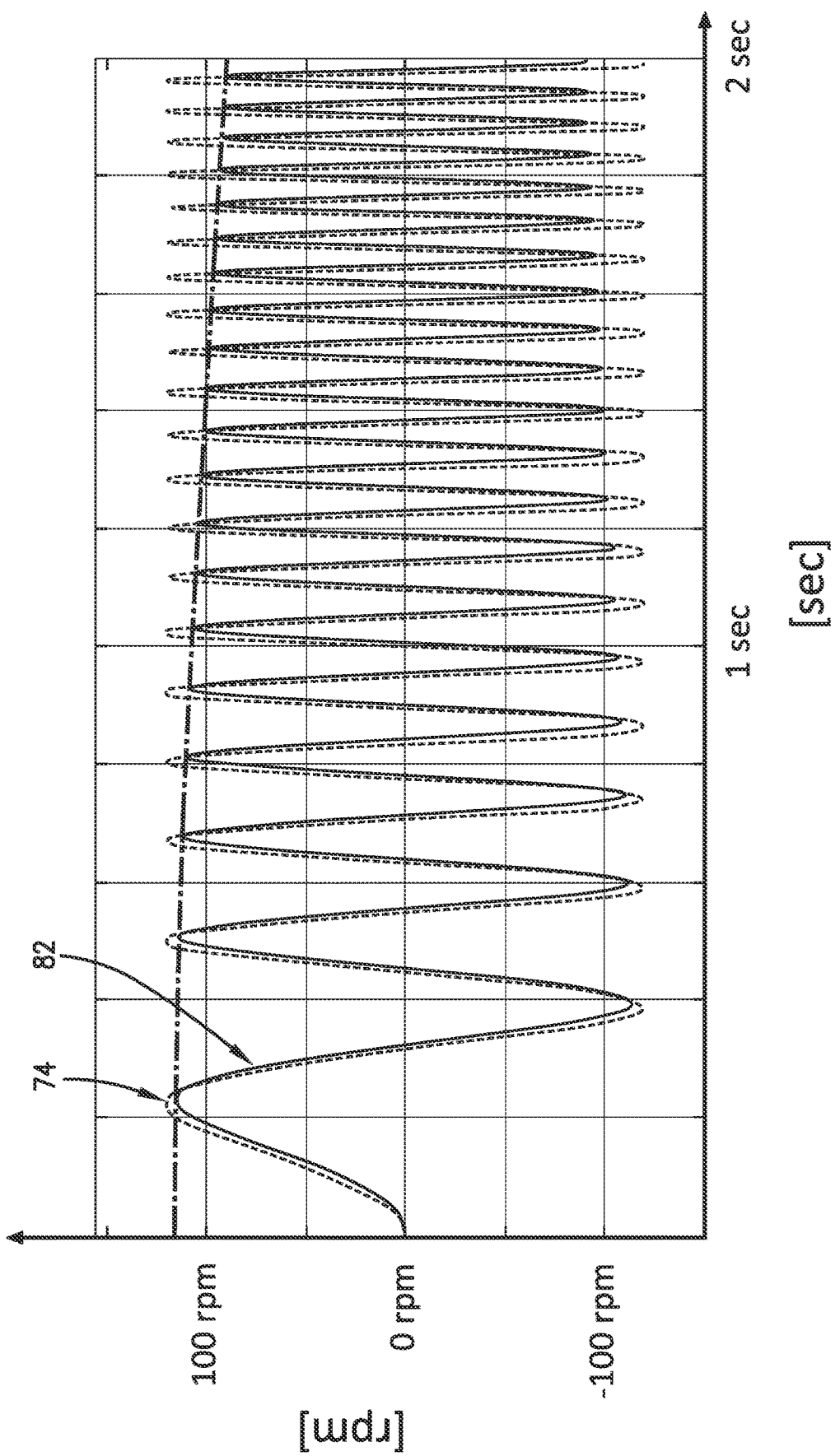
FIG. 5 is a plot of an example excitation signal supplied to the electric motor and a corresponding speed response.
Figure 6:
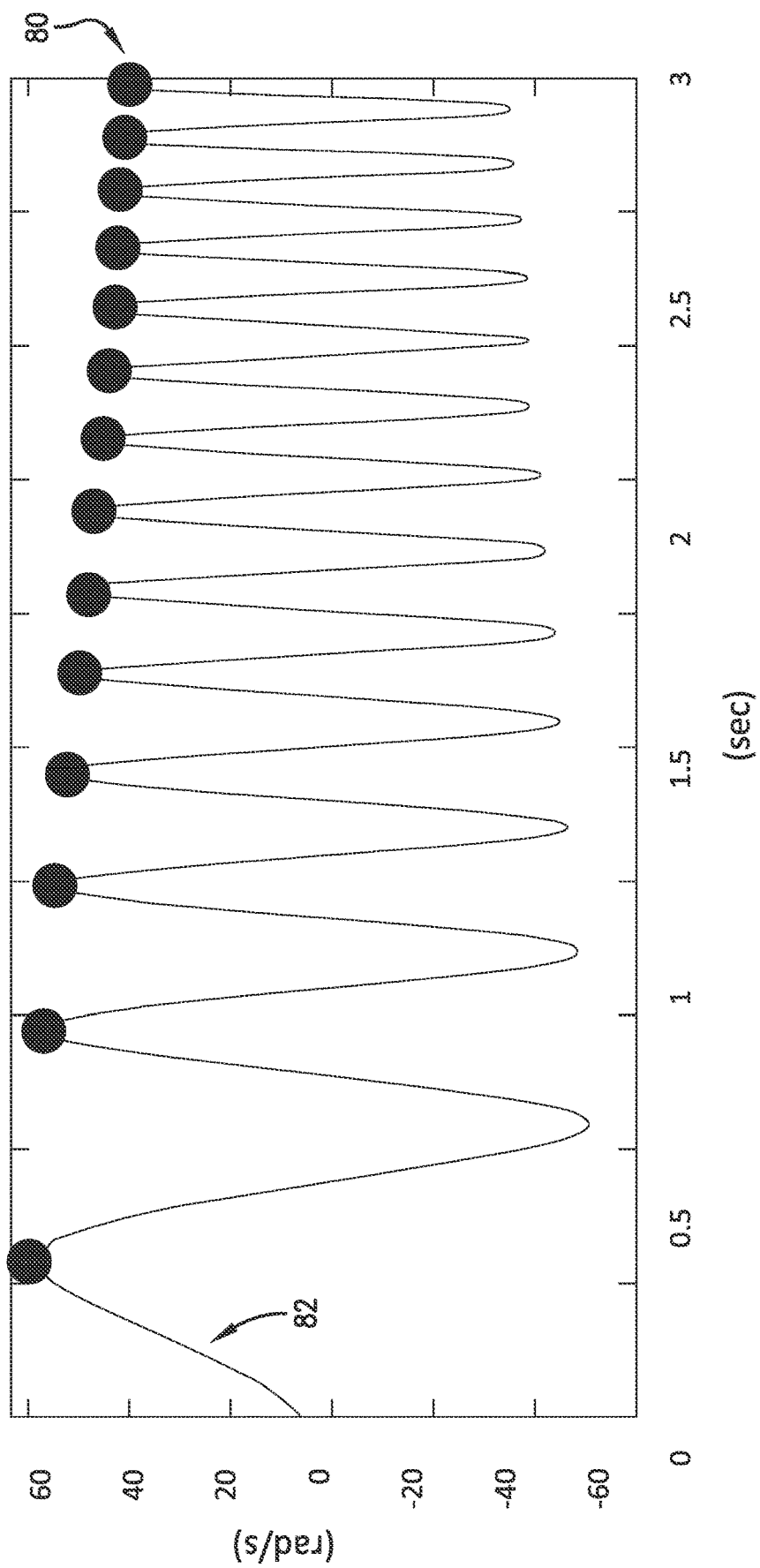
Figure 7:
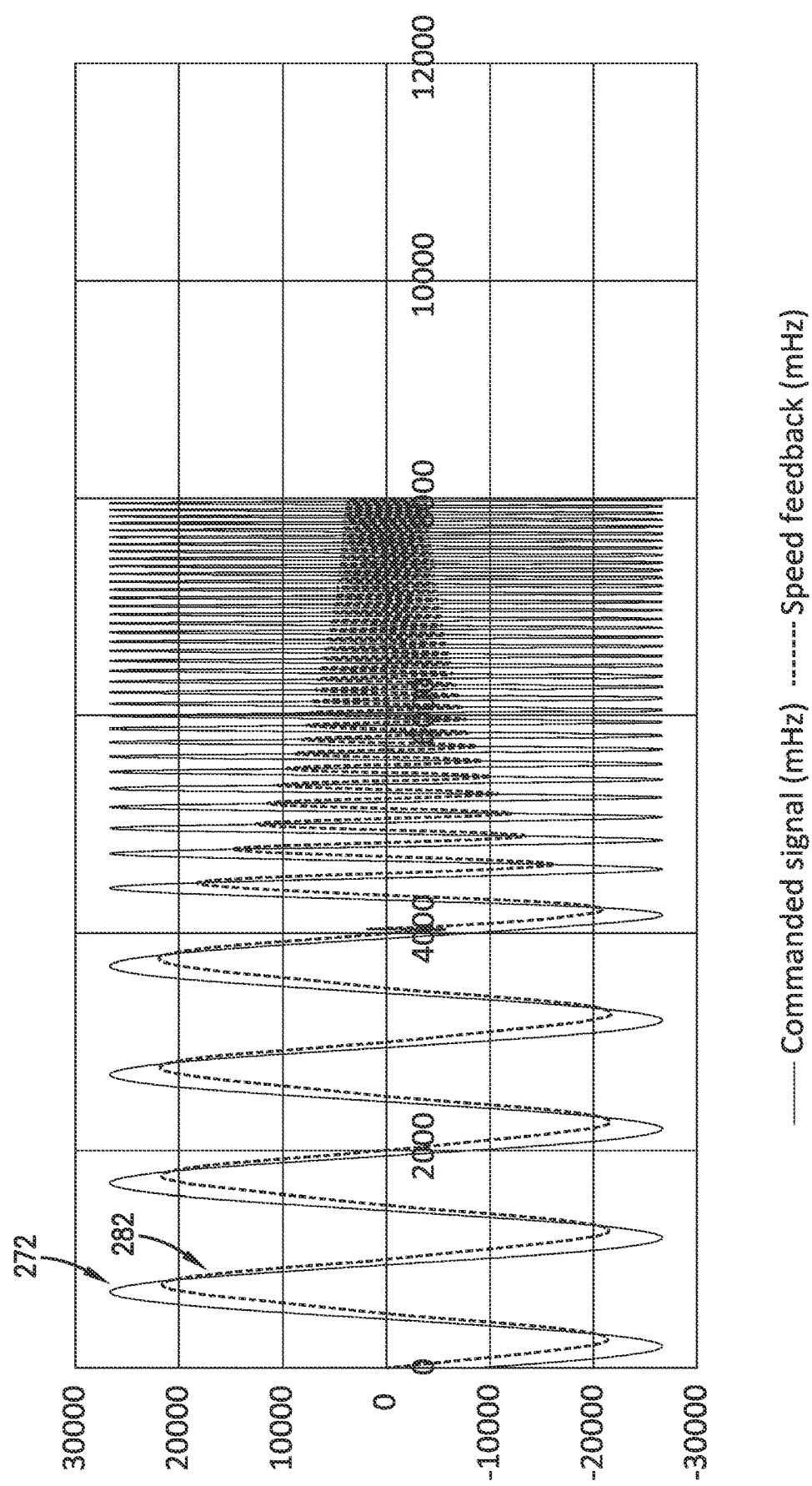
Figure 8:
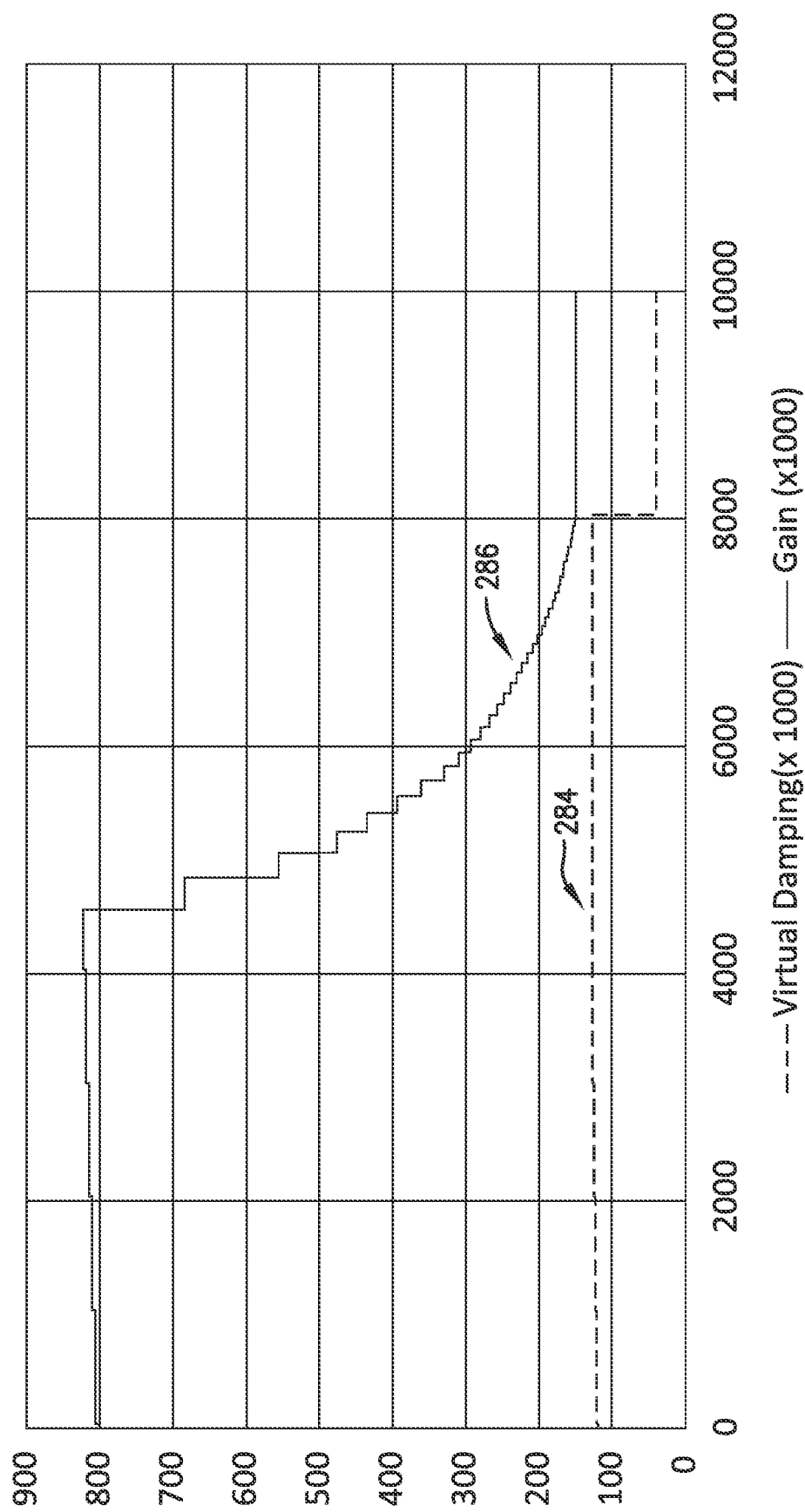

FIG. 6 a plot of an example of a set of peak value sampling points of the speed response of FIG. 5;

FIG. 7 is a plot of an example speed reference and excitation signal as a chirp signal with a ratio of ten percent, and an example speed response; and FIG. 8 is a plot of an example virtual attenuation calculation and a resulting system gain response.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments, but is not necessarily included. Thus, particular implementations of the present invention can include a variety of combinations and/or integrations of the embodiments described herein.

Broadly, embodiments of the present invention provide a static auto-tuning system and method configured to accurately determine one or more characteristics, such as an inertia value and a rotating friction coefficient value, of a system, and then use the determined characteristics to calculate closed-loop speed control gains and better control operation, such as speed regulation, of a motor component of the system.

Conventional dynamic auto-tuning solutions heavily accelerate and decelerate a system in order to calculate the inertia value and the friction coefficient value of the system, but these solutions cannot be used in many applications, such as vehicles or other high-mass loads. Embodiments of the present invention use a static auto-tuning solution which uses relatively limited movement. Conventional static auto-tuning solutions give poor tuning results because of the lack of or limited movement and because of the injection of high-frequency signals to elicit a frequency response required to calculate the desired characteristics. Embodiments of the present invention use a closed-loop method and a virtual damping coefficient which improves the robustness and accuracy of the solution.

Embodiments of the present invention provide several advantages over conventional auto-tuning methods. For example, embodiments use closed loop tuning rather than open loop tuning for better control and accuracy of characteristic estimation. In more detail, embodiments use a proportional loop gain term internally. With only a proportional gain to magnify any error, the speed of the motor does not exceed the maximum value of the speed reference signal, so the movement is always limited by the user-setting. Further, the proportional loop gain is described as the "virtual damping" term, By, because in the closed loop transfer function the proportional gain can increase the effective damping. In some ultra-high inertia servomotor systems with relatively low damping characteristics, the frequency response may be difficult to capture due to the relatively fast decay rate. By adjusting the virtual damping term, By, the present system's high frequency response magnitude is increased which allows for more successful parameter estimation.

For another example, embodiments of the present invention employ two different methods to improve the accuracy of parameter estimation. First, the rotating friction effect is greater under high speed rotation which does not occur in static auto-tuning. As a result of the closed loop topology and adjustable virtual damping design, the rotating friction effect is magnified to an observable level. Because the value of the virtual damping term, By, is algorithmically defined, it can be separated from the real-world rotating friction effect in the calculation process. Second, conventional auto-tuning typically selects an injection signal that is either fixed-frequency or variable-frequency. Embodiments of the present invention use both types of signals: A fixed low frequency sinusoidal signal for better accuracy estimating the rotating friction coefficient value through appropriate determination of virtual damping term and a variable frequency sinusoidal signal for better accuracy estimating an inertia value.

For another example, embodiments of the present invention reduce the computational requirement and can be implemented with low-cost motor control unit without additional hardware. In more detail, the frequency response function must be captured from the output speed signal. Conventionally, this requires a computationally intensive FFT analysis. These embodiments employ a frequency response capture algorithm, referred to as the "peak envelope" method, which automatically captures the peak value of the speed response signal by a computational process which is significantly less intensive than the conventional FFT analysis.

For another example, embodiments may identify and abort the mechanical resonances existing in every real system by checking the determined system gain response values for each test frequency. System gain response is expected to decay with increasing frequency. Embodiments identify these non-decayed gain responses provoked from resonances and abort these solutions from the estimator unit, increasing the accuracy of the determined characteristics.

Figure 1:
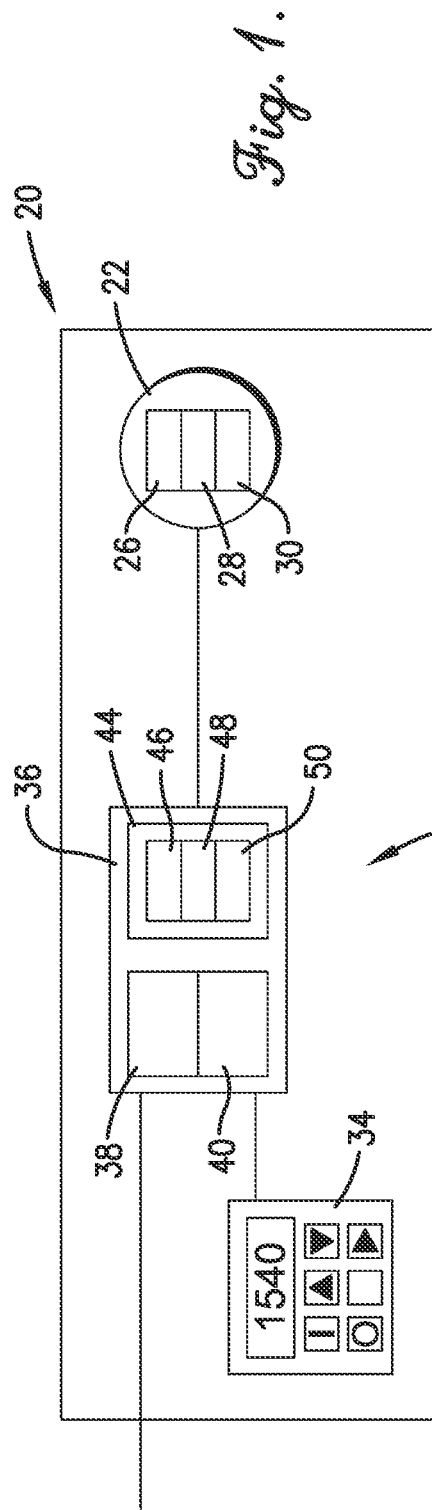
FIG. 1 is a block diagram of an example system comprising an electric motor and a motor controller and incorporating an embodiment of a static auto-tuning apparatus for accurately determining one or more characteristics of a system, and then using the determined characteristics to calculate one or more control parameters to better control operation of the electric motor.

Referring to FIG. 1, there is shown an example system 20 comprising an electric motor 22 and a motor controller 24. The system 20 may be substantially any suitable system, such as a robot or other machine, an automated guided vehicle (AGV), and the like. The electric motor 22 may be configured to drive a load in the system 20, and may include a stator 26, a rotor 28, and a position sensor 30 configured to determine a position (rotation angle) of the rotor. In one implementation, the position sensor 30 may be an encoder. In one implementation, the position sensor 30 may have a relatively high resolution, such as a resolution of approximately one thousand samples for each revolution of the rotor 28.

In one implementation, the motor 22 may be a servomotor. Further, the solution is described herein in an example context involving vector control or field-oriented control (FOC) and a permanent magnet (PM) type synchronous servomotor. However, the present invention is not limited to vector control of PM-type synchronous servomotors, and may be used with substantially any suitable control methods and/or types of motors for which the motor torque can be accurately and directly controlled.

The motor controller 24 may be configured to control operation of the electric motor 22, and the motor controller 24 may include an interface device 34 configured to receive an input and provide an output regarding operation of the motor controller 24, and a control unit 36 configured to control movement of the rotor 28 from a current position to a desired position in response to an instruction input via the interface device 34. The interface device 34 may receive as input and pass to the control unit 36 such information as an upper limit value of a drive current of the motor 22, an upper limit value of a speed of the motor 22, a maximum speed ratio for referenced speed sinusoidal signal amplitude, and a bandwidth range of a referenced speed sinusoidal signal frequency. In one implementation, the interface device 34 may include a keypad for allowing an operator to input an instruction, and a display unit for displaying operation information such as the driving state of the motor 22.

The control unit 36 may broadly include a control signal generator 38 configured to generate a control signal based on the rotor position (rotation angle), and an inverter 40 configured to generate a three-phase AC drive voltage based on the control signal and to provide the drive voltage to the stator 26. The control unit 36 may further include a static auto-tuning apparatus 44 configured to accurately determine one or more characteristics, such as an inertia value and a rotating friction coefficient value, of the system 20, and then using the determined characteristics to calculate one or more control parameters, such as a gain, to better control movement of the rotor 28 and operation, such as speed regulation, of the electric motor 22.

The static auto-tuning apparatus 44 may include speed reference signal generator 46, a correction unit 48, and an estimation unit 50. Broadly, the speed reference signal generator 46 may be configured to generate a speed reference signal resulting in a speed response of the electric motor 22. The correction unit 48 may use closed-loop feedback based on the speed response to correct the speed reference signal so that an amplitude of the speed response resulting from the speed reference signal is constant. The estimation unit 48 may estimate the one or more characteristics of the system 20 based on the speed response, and determine the one or more parameters, including the closed loop speed gains, based on the determined characteristics. The control unit 36 then uses the parameters, including the gains, to control movement of the rotor 28.

Figure 2:
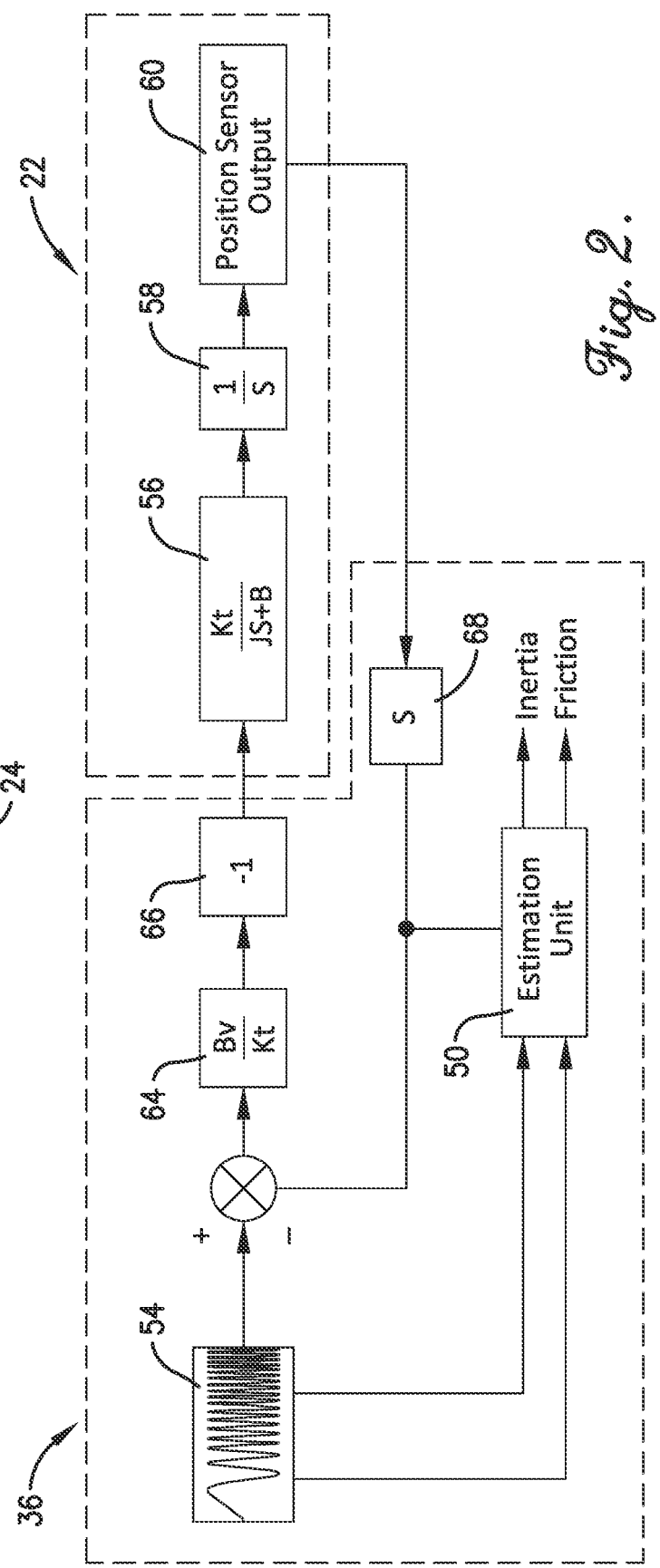
FIG. 2 is a block diagram of an example of a model of the one or more characteristics of the system when static auto-tuning is performed by the static auto-tuning apparatus.

Referring also to FIG. 2, there is shown a block diagram of an example of a model of the one or more characteristics of the system 20 when static auto-tuning is performed by the static auto-tuning apparatus 44. The speed reference signal generation unit 46 may generate the speed reference signal 54 according to the position of the rotor 28 of the motor 22, and the closed loop may be controlled by feedback control according to the generated speed reference signal, thereby controlling the movement of the rotor 28. The mechanical system characteristics may be modeled by (Kt/(Js+B)) 56 of the machine configuration (where Kt is the motor torque constant and defines how much torque the motor should produce when supplied with current), the rotation angle (1/S) 58 of the motor 22, and the position sensor 30, which results in a position sensor output 60. The correction unit 48 may use the model 56 of the system characteristics to determine the characteristics. A virtual attenuation term (By/Kt) 64 may be generated by the correction unit 48, a current control loop (−1) 66, and an angle/velocity conversion (S) 68. The estimation unit 50 may receive the one or more system characteristics, including the speed frequency response obtained by the angle/velocity conversion 68, and calculate the one or more control parameters, including the inertia value (Js) and the friction coefficient value (B), as well as the speed control gains. In one implementation, some or all of the calculations may be performed by a conventional motor-drive motor control unit for dual channel motor controllers. In one implementation, a conventional information processing device such as a personal computer, a programmable logic controller, or the like may be used to implement some or all of the functions of the interface device 34 and the control unit 36.

Figure 3:
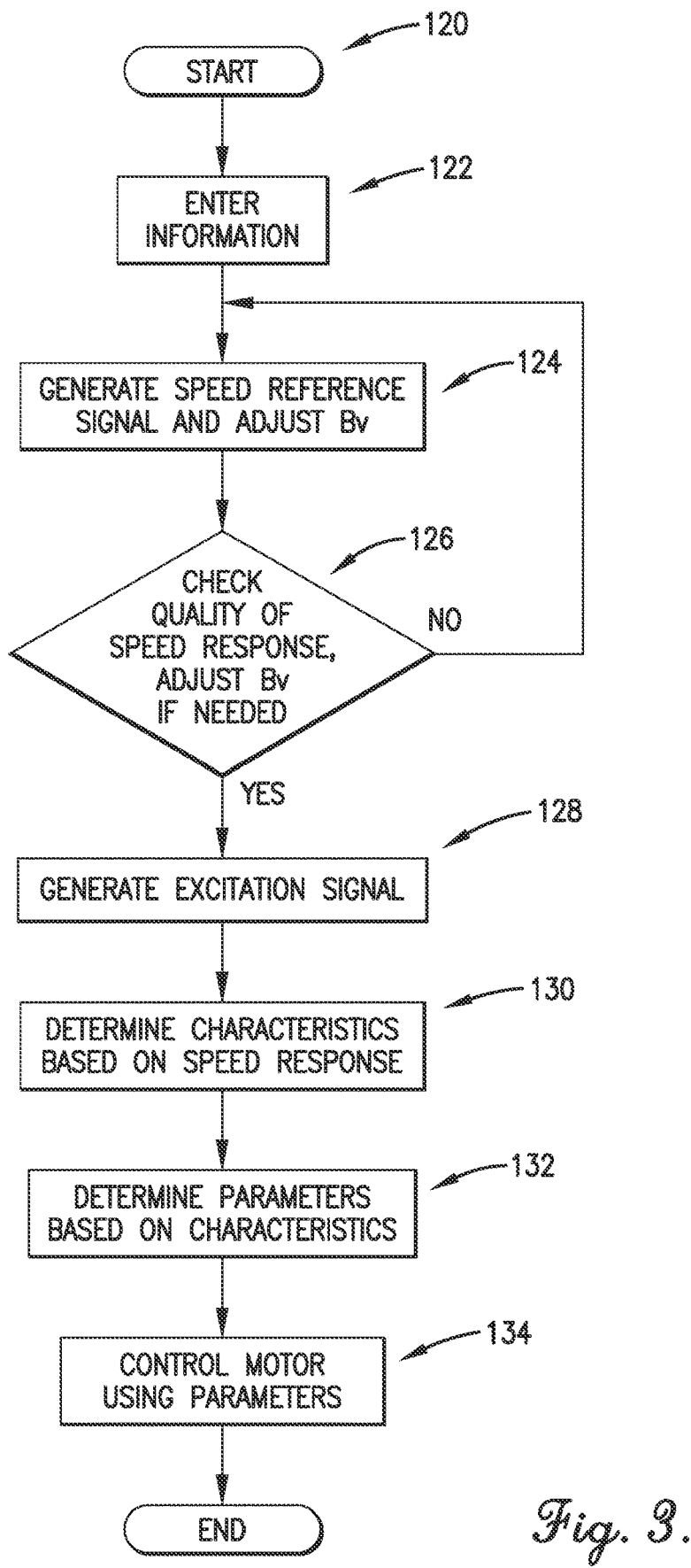
FIG. 3 is a flowchart of a static auto-tuning method for accurately determining one or more characteristics of a system, and then using the determined characteristics to calculate one or more control parameters to better control operation of the electric motor.

Referring also to FIG. 3, there is shown a static auto-tuning method 120 for accurately determining one or more characteristics, such as an inertia value and a rotating friction coefficient value, of the system 20, and then using the determined characteristics to calculate one or more control parameters, such as the gains, to better control movement of the rotor 28 and operation, such as speed regulation, of the electric motor 22. The method 120 is described with reference to the system 20, described above, and may be implemented with and describe the functionality of some or all of the components of the system 20. Some or all of these steps may be implemented in hardware, firmware, software, or combinations thereof.

Figure 4:
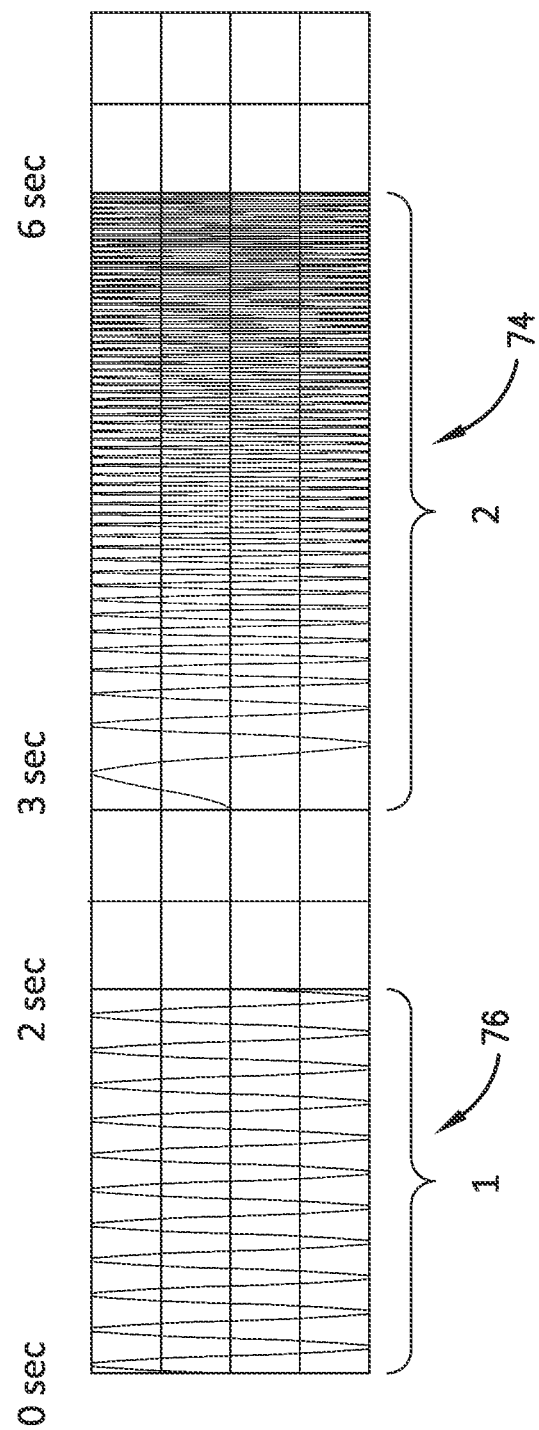
FIG. 4 is a plot of an example speed reference signal and an example excitation signal.

As shown in step 122, relevant information, such as an upper limit value of a drive current of the motor 22, an upper limit value of a speed of the motor 22, and a maximum speed ratio (a percentage, for example, ten percent, of maximum speed which determines the amplitude of the waveform in FIG. 4) may be entered using the interface device 34. Additionally, a bandwidth of a speed reference signal 54 may be entered. This information may be sent to the control unit 36.

As shown in step 124, the speed reference signal 54 may be generated by the speed reference signal generator 46 of the control unit 36, resulting in a speed response. The speed reference signal 54 may reflect the information input in step 122. Additionally, an amplitude of the speed response may be observed by the speed reference signal generator 46, and a virtual attenuation value, By, may be adjusted by the speed reference signal generator 46 using closed-loop feedback until the speed gain response (output/input signal) is higher than a predefined threshold. In one implementation, the speed signal 54 may be a referenced sinusoidal signal with a fixed frequency at first stage determining the virtual attenuation value By 76, and in second stage of the static autotune method an excitation chirp speed signal 74 with increasing frequency up to the bandwidth configured (shown in FIG. 4). The chirp signal waveforms may be generated by a sinusoidal function with a relatively low computational cost.

For example, a fixed frequency (of, for example, one Hertz) sinusoidal speed reference signal may be generated, the speed response to the speed reference signal may be measured, and the amplitude thereof may be observed. It may then be determined whether the magnitude of the speed response is higher than a predefined threshold level. This threshold value (for example, eighty percent) may be hard-coded rather than user-defined. If the magnitude of the speed response is higher than the threshold value, the By value may be corrected. In particular, if the magnitude of the speed response is less than or equal to the threshold value, the By value may be automatically increased, the magnitude of the velocity response may be observed again, and the By value may be set.

As shown in step 126, it may be determined whether or not the quality of the speed reference signal corresponding to the virtual attenuation term, By, which was automatically adjusted in step 124, is acceptable in terms of not exceeding the defined and predefined values which were either entered in step 122 or hardcoded, and if not, returns to step 124 to readjust By. Specifically, the virtual attenuation term, By, is automatically adjusted so that the rotating friction effect to be magnified to an observable level, increasing its estimation accuracy.

In step 128, once the quality of the speed response corresponding to the virtual attenuation term, By, is acceptable, an excitation speed chirp signal 74 (shown in FIG. 4) may be generated by the correction unit 48 of the control unit 36 to acquire the frequency response function for performing the static auto-tuning of the motor 22. In an example implementation, the chirp signal may have a fixed amplitude and an increasing frequency of, for example, one Hertz ramping up to four hundred Hertz. In another example, the chirp signal may increase the frequency until the predefined system gain responses required sampling points have been fulfilled.

In step 130, one or more characteristics of the system 20, such as inertia value (Js) and rotating friction coefficient value (B), may be determined by the estimation unit 50 of the control unit 36 from the speed response (frequency response function) corresponding to the excitation signal generated in step 128, considering also the virtual attenuation term By.

In step 132, one or more parameters for controlling the motor 20, such as speed control gains, may be determined by the estimation unit 50 according to the determined system characteristics (the inertia value and the friction coefficient value). In one implementation, shown in FIG. 6 and described in greater detail below, the speed response 82 may be sampled at regular intervals, and a peak value 80 in each interval is identified and stored to produce an envelope of peak values which are used in calculating the system gain response and then in determining the system characteristics.

In step 134, movement of the rotor 28 and the speed of the motor 22 may be controlled by the control unit 36 according to the set system parameters, including the gains. In particular, once the control unit 36 is accurately adjusted for different payloads, the efficiency, reliability, and ability to control the motor can be greatly improved.

Referring also to FIG. 4, there is shown an example of the speed command 54, including a speed reference signal 76 generated in step 124 and an excitation signal 74 generated in step 128. The control unit 36 may generate the speed reference signal 76 having a fixed frequency, and then determine the virtual damping coefficient By in order to facilitate estimating accurately the system friction coefficient (B). The control unit 36 may generate a chirp, or variable frequency, signal as the excitation signal 74 in order to collect the frequency response data of the system 20, and based on the frequency response obtained as a result in step 130, the estimation unit 50 may determine the inertia value (Js) of the system 20. In one implementation, the frequency response function may be estimated by fitting a curve to the frequency response data of the system 20 according to the velocity response. The frequency response function can, for example, redistribute the system transfer function (closed loop) of the following frequency S domain. This function contains information such as the inertia value (Js) and coefficient of friction value (B). The control unit 36 may generate a fixed frequency signal 76, and the estimation unit 50 may determine the friction coefficient value in 130 based on the determined virtual damping coefficient and the speed feedback frequency response obtained as a result.

Referring also to FIG. 5, there is shown an example excitation signal 74 reflecting the virtual attenuation term, By, which is automatically adjusted in step 124 and supplied to the motor 22, and a speed response 82 of the motor 22 corresponding to the excitation reference signal 74. As described above, by automatically adjusting the virtual attenuation term, By at fixed frequency stage, so that the amplitude of the speed is higher than a predefined threshold, the speed response 82 can be obtained. This facilitates estimating the characteristics of the system 20. The system transfer function characteristic, particularly the gain response, may be estimated from the envelope of the speed response 82 without needing to perform a complicated algorithm such as a fast Fourier transform. As a result, the computational load and the cost are reduced.

Referring also to FIG. 6, there is shown an example of peak value sampling points 80 of the speed response 82 acquired in step 128. Because the virtual attenuation term, By, is automatically adjusted at fixed frequency stage, so that the amplitude of the speed is higher than a predefined threshold, the gain response is reflected in the envelope of the speed feedback 82. Thus, the speed response 82 may be sampled at regular intervals, and the data at the peak points 80 of the speed response may be used for estimating the parameters. The peak point 80 of the speed response 82, for example, may be sampled at a sampling frequency of at least ten times the maximum frequency of the excitation signal, and the maximum value in one cycle may be stored as sampling point data. The frequency response function may be captured from the output signal. Conventionally, FFT is used for this, but implementations may employ a frequency response capture algorithm, referred to as "peak envelope," which automatically captures the speed response peak value for each frequency injection test sample.

By storing only the peak points 82 of the speed response 80 as data, the number of data points for estimating the mechanical system characteristics is reduced, and so the process can be accomplished by a processor having a relatively small memory storage capacity. Estimated mechanical system characteristics can be calculated using the envelope based on the peak point data, and so the process can be accomplished by an inexpensive processor rather than a more costly high-performance processor. In one implementation, the gain values and corresponding frequencies may be entered into a regressive solver to calculate the peak envelope result. The regressive solver may be a linear regression calculator uses the least squares iterative method to find the line of best fit for a set of inertia values $Js_i$, which have been expressed as a function of the estimated friction values Bi. Thus, embodiments allow for reducing the storage capacity of the memory and for reducing the calculation load for performing appropriate control, thereby reducing the overall cost of the static auto-tuning solution.

FIGS. 7 and 8 show an example application of these techniques. FIG. 7 shows an example part of fixed low frequency signal and an excitation signal 272 as a chirp signal, where its amplitude is a ratio of ten percent, and an example speed response 282. FIG. 8 shows the virtual attenuation 284, and the resulting gain 286.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A system comprising:
   an electric motor driving a load in the system, the electric motor including a stator, a rotor, and a position sensor determining a position of the rotor; and
   a motor controller controlling operation of the electric motor, the motor controller including a control unit controlling movement of the rotor, the control unit including a static auto-tuning apparatus determining a plurality of gains to facilitate controlling movement of the rotor, the static auto-tuning apparatus including—
      a speed reference signal generator generating a speed reference signal resulting in a speed response of the electric motor,
      a correction unit using closed-loop feedback based on a speed command to correct a speed of the electric motor so that a magnitude of a high frequency response of the system is increased to facilitate estimating one or more characteristics of the system, and
      an estimation unit estimating the one or more characteristics of the system based on the speed response and a determined virtual damping coefficient, and capturing a gain frequency response based on the one or more characteristics of the system, and determining the plurality of gains based on the gain frequency response,
   wherein the control unit uses the plurality of gains in controlling movement of the rotor.

2. The system of claim 1, wherein the system is an automated guided vehicle, and the electric motor is a servomotor.

3. The system of claim 1, the position sensor having a resolution of at least one thousand samples for each revolution of the rotor.

4. The system of claim 1, the motor controller further including an interface device receiving an input and providing an output regarding operation of the motor controller, and the control unit receiving from the interface device the input including—
   an upper limit value of a drive current of the motor;
   an upper limit value of a speed of the motor;
   a maximum speed amplitude ratio; and
   a frequency bandwidth of the speed reference signal.

5. The system of claim 1, the control unit further including—
   a control signal generator generating a control signal based on the position of the rotor as determined by the position sensor; and an inverter generating a drive voltage based on the control signal and providing the drive voltage to the stator.

6. The system of claim 1, wherein the speed reference signal is a chirp sinusoidal signal.

7. The system of claim 1, wherein the speed reference signal generator—
observes an amplitude of the speed response resulting from the speed reference signal; and
adjusts a virtual attenuation value at fixed frequency stage, until the amplitude of the speed is higher than a predefined threshold.

8. The system of claim 1, wherein—
the correction unit generates an excitation signal and obtains a frequency response function resulting from the excitation signal;
the estimation unit estimates the one or more characteristics of the system based on the frequency response function resulting from the excitation signal; and
the control unit sets one or more control parameters, including the plurality of gains, based on the one or more characteristics of the system estimated by the estimation unit, and controls operation of the electric motor based on the one or more control parameters.

9. The system of claim 8, the one or more characteristics of the system including an inertia value and a friction coefficient value.

10. The system of claim 8, wherein the speed command includes—
the speed reference signal having a fixed frequency resulting in the speed response based on which the virtual damping coefficient is determined; and
an excitation signal generated by the correction unit having a fixed amplitude and an increasing frequency and resulting in a frequency response function based on which the estimation unit determines an inertia characteristic and a rotating friction characteristic of the system, considering the virtual damping coefficient.

11. The system of claim 1, the estimation unit sampling the excitation signal at regular intervals and identifying and storing a peak value in each interval to produce an envelope of peak values which are used in determining the gain frequency response.

12. A system comprising:
an electric servomotor driving a load in the system, the electric servomotor including a stator, a rotor, and a position sensor determining a position of the rotor, the position sensor having a resolution of at least one thousand samples for each revolution of the rotor; and
a motor controller controlling operation of the electric servomotor, the motor controller including an interface device receiving an input and providing an output regarding operation of the motor controller, and a control unit receiving the input from the interface device and controlling movement of the rotor, the control unit including—
a control signal generator generating a control signal based on the position of the rotor as determined by the position sensor,
an inverter generating a drive voltage based on the control signal and providing the drive voltage to the stator, and
a static auto-tuning apparatus determining a plurality of gains to facilitate controlling movement of the rotor, the static auto-tuning apparatus including—
a speed reference signal generator generating a speed reference signal resulting in a speed response of the servomotor, the speed reference signal being a chirp sinusoidal signal,
a correction unit using closed-loop feedback based on a speed command to correct a speed of the electric motor so that a magnitude of a high frequency response of the system is increased to facilitate estimating one or more characteristics of the system, and
an estimation unit estimating one or more characteristics of the system, including an inertia value and a rotating friction coefficient value, based on the speed response and a determined virtual damping coefficient, and determining a gain frequency response based on the one or more characteristics of the system, and determining the plurality of gains based on the gain frequency response,
wherein the control unit uses the plurality of gains in controlling movement of the rotor and the speed of the electric servomotor.

13. The system of claim 12, the control unit receiving from the interface device the input including—
an upper limit value of a drive current of the servomotor;
an upper limit value of a speed of the servomotor;
a maximum speed amplitude ratio; and
a frequency bandwidth of the speed reference signal.

14. The system of claim 12, wherein the speed reference signal generator—
observes an amplitude of the speed response resulting from the speed reference signal; and
adjusts a virtual attenuation value at fixed frequency stage, until the amplitude of the speed is higher than a predefined threshold.

15. The system of claim 12, wherein—
the correction unit generates an excitation signal and obtains a frequency response function resulting from the excitation signal;
the estimation unit estimates the one or more characteristics of the system based on the frequency response function resulting from the excitation signal; and
the control unit sets one or more control parameters, including the plurality of gains, based on the one or more characteristics of the system estimated by the estimation unit, and controls operation of the servomotor based on the one or more control parameters.

16. The system of claim 15, wherein—
the speed reference signal having a fixed frequency resulting in the speed response based on which the virtual damping coefficient is determined; and
an excitation signal generated by the correction unit having a fixed amplitude and an increasing frequency and resulting in a frequency response function based on which the estimation unit determines an inertia characteristic and a rotating friction characteristic of the system, considering the virtual damping coefficient.

17. The system of claim 12, the estimation unit sampling the excitation signal at regular intervals and identifying and storing a peak value in each interval to produce an envelope of peak values which are used in determining the gain frequency response.

18. A static auto-tuning method for facilitating controlling operation of a servomotor driving a load in a system, the electric servomotor including a stator, a rotor, and a position sensor determining a position of the rotor, the position sensor having a resolution of at least one thousand samples for each revolution of the rotor, the static auto-tuning method comprising:

generating a speed reference signal resulting in a speed response of the servomotor, the speed reference signal being a chirp sinusoidal signal;

using closed-loop feedback based on a speed command to correct a speed of the electric motor so that a magnitude of a high frequency response of the system is increased to facilitate estimating one or more characteristics of the system;

estimating one or more characteristics of the system, including an inertia value and a rotating friction coefficient value, based on the speed response and a determined virtual damping coefficient; and determining a gain frequency response based on the one or more characteristics of the system, and determining the plurality of gains based on the gain frequency response, including— generating an excitation signal and obtaining a frequency response function resulting from the excitation signal, wherein the excitation signal is sampled at regular intervals, and a peak value in each interval is identified and stored to produce an envelope of peak values which are used in determining the gain frequency response, estimating the one or more characteristics of the system based on the envelope of peak values, and setting one or more control parameters, including the plurality of gains, based on the one or more characteristics of the system; and controlling movement of the rotor and the speed of the servomotor using the plurality of gains.

19. The static auto-tuning method of claim 18, further including— observing an amplitude of the speed response resulting from the speed reference signal; and adjusting a virtual attenuation value at fixed frequency stage, until the amplitude of the speed is higher than a predefined threshold.

20. The static auto-tuning method of claim 18, wherein the speed command includes— the speed reference signal having a fixed frequency resulting in the speed response based on which the virtual damping coefficient is determined; and an excitation signal generated by the correction unit having a fixed amplitude and an increasing frequency and resulting in a frequency response function based on which the estimation unit determines an inertia characteristic and a rotating friction characteristic of the system, considering the virtual damping coefficient.

* * * * *